United States Patent [19]
Morimoto et al.

[11] Patent Number: 6,084,222
[45] Date of Patent: Jul. 4, 2000

[54] INDUCTION HEATING APPARATUS FOR JOINING SHEET BARS

[75] Inventors: Kazuo Morimoto; Kazuya Tsurusaki; Kanji Hayashi, all of Hiroshima; Atsushi Yuki, Chiba; Shigefumi Katsura, Chiba; Shigeru Isoyama, Chiba; Hideyuki Nikaido, Chiba, all of Japan

[73] Assignees: Mitsubishi Heavy Industries, Ltd., Tokyo; Kawasaki Steel Corporation, Hyogo, both of Japan

[21] Appl. No.: 09/236,628

[22] Filed: Jan. 26, 1999

[30] Foreign Application Priority Data

Jan. 26, 1998 [JP] Japan .................................. 10-012230

[51] Int. Cl.⁷ .............................. H05B 6/10; H05B 6/40
[52] U.S. Cl. ........................ 219/603; 219/632; 219/645; 219/659; 219/670
[58] Field of Search ..................... 219/602, 603, 219/645, 646, 647, 649, 659, 670, 672, 676, 632; 228/151, 158, 232.5; 72/202

[56] References Cited

U.S. PATENT DOCUMENTS 4,220,839 9/1980 De Leon ................................ 219/638
4,587,392 5/1986 Chausse et al. ........................ 219/670

FOREIGN PATENT DOCUMENTS

| 0661112 A1 | 7/1995 | European Pat. Off. . |
| 0691163 A1 | 1/1996 | European Pat. Off. . |
| 7-1005 | 1/1995 | Japan . |
| 8-1204 | 1/1996 | Japan . |
| 8192206 | 7/1996 | Japan . |

Primary Examiner—Philip H. Leung

[57] ABSTRACT

A sheet bar joining apparatus comprises a heater provided between a delivery-side clamp for clamping a rear end of a preceding sheet bar and an entry-side clamp for clamping a front end of a succeeding sheet bar; upper and lower anti-buckling plates provided on the entry-side clamp and located above and below the sheet bars; upper comb tooth portions and lower comb tooth portions formed in the upper and lower anti-buckling plates, respectively; a heat resistant insulator provided at a surface of each comb tooth portion opposed to the sheet bars; and a plurality of groove portions provided near the surface of each comb tooth portion opposed to the sheet bars.

12 Claims, 9 Drawing Sheets

(a)

(b)

INDUCTION HEATING APPARATUS FOR JOINING SHEET BARS

BACKGROUND OF THE INVENTION

1. Field of the Invention

The present invention relates to a sheet bar joining apparatus for joining rough rolled sheet bars in continuous rolling equipment.

2. Description of the Related Art

In continuous rolling equipment for joining rough rolled materials (hereinafter referred to as sheet bars) to finish them continuously, it is generally necessary to join a rear end of a preceding sheet bar to a front end of a succeeding sheet bar, thereby increasing the work efficiency. A conventional sheet bar joining apparatus has joined the preceding sheet bar and the succeeding sheet bar together in the following manner: With the rear end of the preceding sheet bar and the front end of the succeeding sheet bar being clamped, these ends are heated with eddy currents generated by an alternating magnetic flux applied from an induction coil, and are pressed against each other in the heated condition. Such a sheet bar joining apparatus is disclosed, for example, in Japanese Unexamined Patent Publication No. 1005/95.

FIG. 7 is a plan view of the conventional sheet bar joining apparatus. FIG. 8 is a sectional view along line VIII—VIII of FIG. 7. FIGS. 9(a) and 9(b) are schematic views of an alternating magnetic flux applied from an induction coil in the conventional sheet bar joining apparatus, and eddy currents generated by the magnetic flux.

With the conventional sheet bar joining apparatus, as illustrated in FIGS. 7 and 8, a preceding sheet bar $S_1$ and a succeeding sheet bar $S_2$ are moved in a direction of an arrow A, as indicated in FIG. 7, by rolling rolls (not shown), with a rear end portion of the preceding sheet bar $S_1$ and a front end portion of the succeeding sheet bar $S_2$ being placed close to each other.

The succeeding sheet bar $S_2$ can be clamped between an upper clamp 101 and a lower clamp 102 of an entry-side frame (not shown). Whereas the preceding sheet bar $S_1$ can be clamped between an upper clamp 103 and a lower clamp 104 of a delivery-side frame (not shown). The clamps 101 and 102 of the entry-side frame can be moved in a direction of transport by a pressure cylinder (not shown), and thereby can press the front end portion of the clamped succeeding sheet bar $S_2$ against the rear end portion of the preceding sheet bar $S_1$.

The clamps 101 and 102 of the entry-side frame are provided with a pair of (i.e., upper and lower) anti-buckling plates 105 and 106 extending horizontally toward the delivery side. The anti-buckling plates 105 and 106 have upper comb tooth portions 107 and lower comb tooth portions 108, respectively. Heaters 109 are provided around the anti-buckling plates 105 and 106. The heater 109 comprises induction coils 112 and 113 provided so as to wind round upper and lower C-shaped iron cores 110 and 111.

By the action of the rolling rolls, the preceding sheet bar $S_1$ and the succeeding sheet bar $S_2$ are continuously transported, and the rear end portion of the preceding sheet bar $S_1$ and the front end portion of the succeeding sheet bar $S_2$ come to the center of the heater 109, with these end portions approaching each other. At this time, a hydraulic cylinder (not shown) is actuated to clamp the succeeding sheet bar $S_2$ by the upper and lower clamps 101 and 102, and clamp the preceding sheet bar $S_1$ by the upper and lower clamps 103 and 104. On this occasion, the sheet bars $S_1$ and $S_2$ are held in a sandwiched manner by the upper and lower anti-buckling plates 105 and 106 between the clamps 101 and 102 and the clamps 103 and 104. Thus, a difference in level between the sheet bars $S_1$ and $S_2$ is corrected, and their possible buckling is prevented.

In this state, a magnetic flux $\Phi$ is generated between the upper and lower C-shaped iron cores 110 and 111 to induce eddy currents E1 in the rear end portion of the preceding sheet bar $S_1$ and the front end portion of the succeeding sheet bar $S_2$, thereby heating these end portions to a temperature at which they can be joined together. At this time, eddy currents E2 are induced in the upper comb tooth portions 107 and the lower comb tooth portions 108. However, each of these eddy currents E2 must make a circle in a plane. Since its width is narrow, the circling adjacent eddy currents E2 interfere, counteracting each other. As a result, the current density decreases, and the Joule heat generated becomes small.

With the foregoing conventional sheet bar joining apparatus, the preceding sheet bar $S_1$ and the succeeding sheet bar $S_2$ are clamped, and held by the upper and lower anti-buckling plates 105 and 106 in a sandwiched fashion. In this state, as shown in FIGS. 7 and 8, the magnetic flux $\Phi$ is generated between the upper and lower C-shaped iron cores 110 and 111 to induce the eddy currents E1. The eddy currents E2 are also induced in the upper comb tooth portions 107 and the lower comb tooth portions 108. Under these actions, the sheet bars $S_1$ and $S_2$ are joined together.

In this case, at a widthwise central portion of each of the sheet bars $S_1$ and $S_2$, magnetic flux $\Phi$ passes through the upper comb tooth portions 107 and the lower comb tooth portions 108 as well as the sheet bars $S_1$ and $S_2$ to induce the eddy currents E2, as shown in FIGS. 8 and 9(a). Thus, the sheet bars $S_1$ and $S_2$ are heated at this site. At widthwise end portions of each of the sheet bars $S_1$ and $S_2$, on the other hand, magnetic reluctance is smaller when magnetic flux $\Phi$ flows outside the sheet bars $S_1$ and $S_2$ (i.e., magnetic flux $\Phi_1$) rather than passing through the sheet bars $S_1$ and $S_2$, as shown in FIGS. 8 and 9(b). Thus, no heat elevation occurs at the widthwise end portions of the sheet bars $S_1$ and $S_2$.

This magnetic flux $\Phi_1$ flowing outside the sheet bars $S_1$ and $S_2$ passes obliquely through end portions of the upper comb tooth portion 107 and the lower comb tooth portion 108. Thus, eddy currents E3 are induced in a vertical direction. Since the anti-buckling upper and lowerplates 105 and 106 have larger heights in the vertical direction than their widths in the plate width direction, these eddy currents E3 grow large. As a result, the comb tooth portions 107 and 108 are overheated to high temperatures. Hence, their fatigue increases, and their life shortens.

With the conventional sheet bar joining apparatus, moreover, when the rear end portion of the preceding sheet bar $S_1$ and the front end portion of the succeeding sheet bar $S_2$ are held by the upper and lower anti-buckling plates 105 and 106 in a sandwiched manner, the eddy currents E2 and E3 are induced in the comb tooth portions 107 and 108. These eddy currents E2 and E3 and the eddy currents E1 induced in the sheet bars $S_1$ and $S_2$ interfere with each other. Consequently, their sites of contact with each other spark, consuming the comb tooth portions 107 and 108.

SUMMARY OF THE INVENTION

The present invention solves the above-described problems. The applicant of the present application has found, from electromagnetic analysis and experiments, that the magnetic flux between the C-shaped iron cores is bent near the ends in the plate width direction of the sheet bar, and caused to pass through the comb tooth portions obliquely. Based on this finding, the applicant has blocked a flow path of eddy currents which were considered not to result from an alternating magnetic field due to the C-shaped iron core. By doing so, the applicant has aimed to provide a sheet bar joining apparatus which suppresses the consumption of the members, thereby prolonging their life and improving their quality.

A sheet bar joining apparatus of the present invention for attaining the foregoing objective comprises a delivery-side clamp capable of clamping a rear end of a preceding sheet bar; an entry-side clamp capable of clamping a front end of a succeeding sheet bar; a heater provided between the delivery-side clamp and the entry-side clamp; anti-buckling plates for the sheet bars, the anti-buckling plates being provided beside the entry-side clamp and above and below the sheet bars; an upper comb tooth portion and a lower comb tooth portion formed in the upper and lower anti-buckling plates, respectively; a heat resistant insulator provided at a surface of each of the upper comb tooth portion and the lower comb tooth portion, the surface being opposed to the sheet bars; and a groove portion provided near the surface of each of the upper comb tooth portion and the lower comb tooth portion opposed to the sheet bars.

Thus, sparking due to the passage of eddy currents at surfaces of contact between the upper and lower comb tooth portions and the sheet bars is eliminated. Consequently, consumption of the upper and lower comb tooth portions can be suppressed, the life of the members extended, and the quality of the sheet bars improved.

Furthermore, a vertical flow of eddy currents in the upper and lower comb tooth portions located at both end portions in the width direction of the sheet bars can be impeded by the groove portion, and heat generation of the upper and lower comb tooth portions can be suppressed.

The heat resistant insulator may be fitted into each of the upper comb tooth portion and the lower comb tooth portion in a longitudinal direction thereof. This makes its mounting easy.

A plurality of the groove portions may be provided in each of the upper comb tooth portion and the lower comb tooth portion in the longitudinal direction thereof. Thus, heat generation of the upper and lower comb tooth portions can be suppressed reliably.

The groove portion may be provided only in each of the upper comb tooth portion and the lower comb tooth portion which are located at both end portions in a width direction of each of the anti-buckling plates.

The groove portions may be provided in both sides of each of the upper comb tooth portion and the lower comb tooth portion such that the heat resistant insulator is exposed.

A cooling water flow hole may be provided inside each of the upper comb tooth portion and the lower comb tooth portion, whereby heat generation of the upper and lower comb tooth portions can be suppressed.

The heater may be composed of a C-shaped iron core divided in the width direction of the sheet bar, and induction coils wound around the C-shaped iron core, so that the structure of the heater can be simplified.

The entry-side clamp may be movable in a direction of travel of the sheet bars, so that fine adjustment of the clamp position becomes easy.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

An embodiment of the present invention will now be described in detail with reference to the accompanying drawings, but it should be understood that the invention is not restricted thereby.

Figure 5:
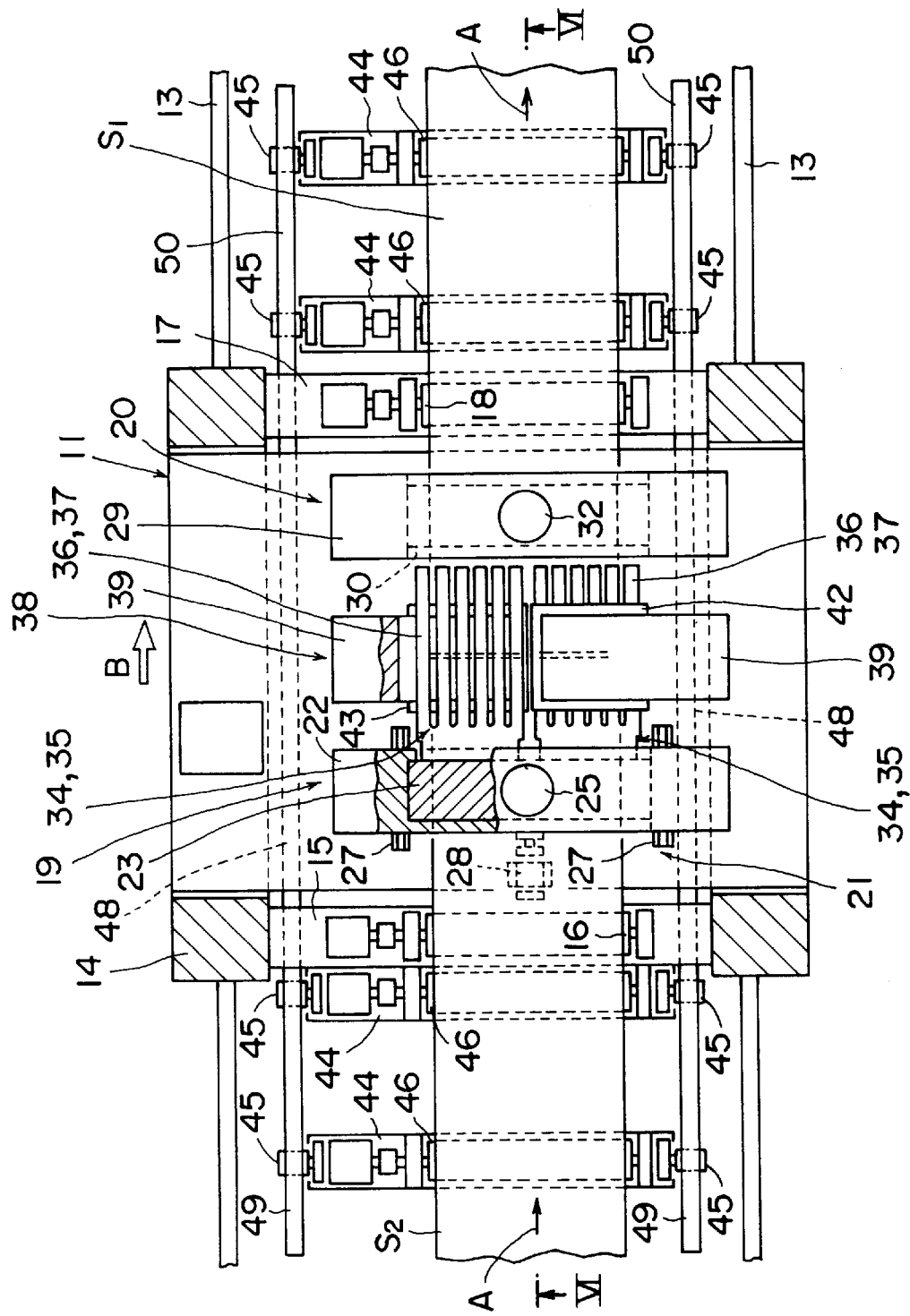
FIG. 5 is a partially cutaway plan view of the sheet bar joining apparatus according to the present embodiment.
Figure 6:
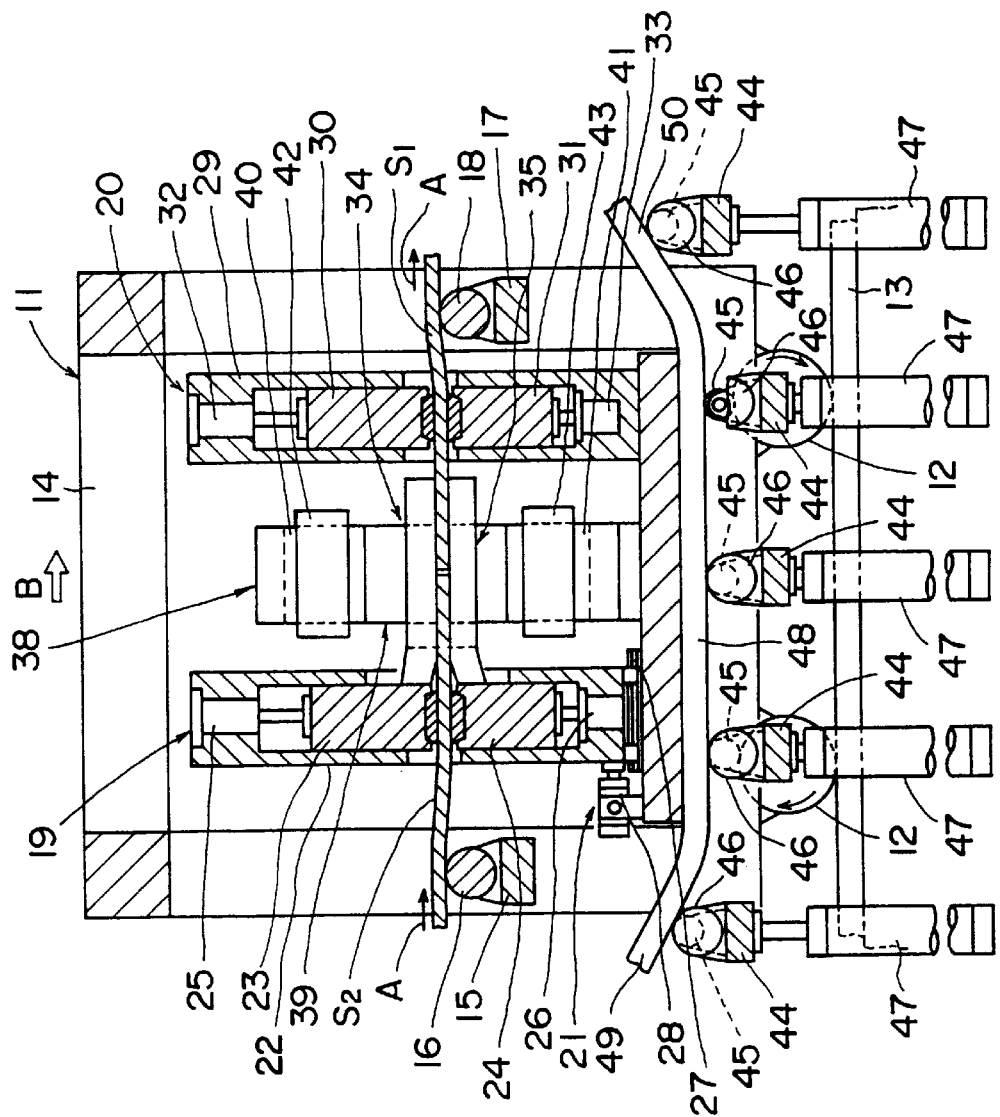
FIG. 6 is a sectional view taken on line VI—VI of FIG. 5.
Figure 7:
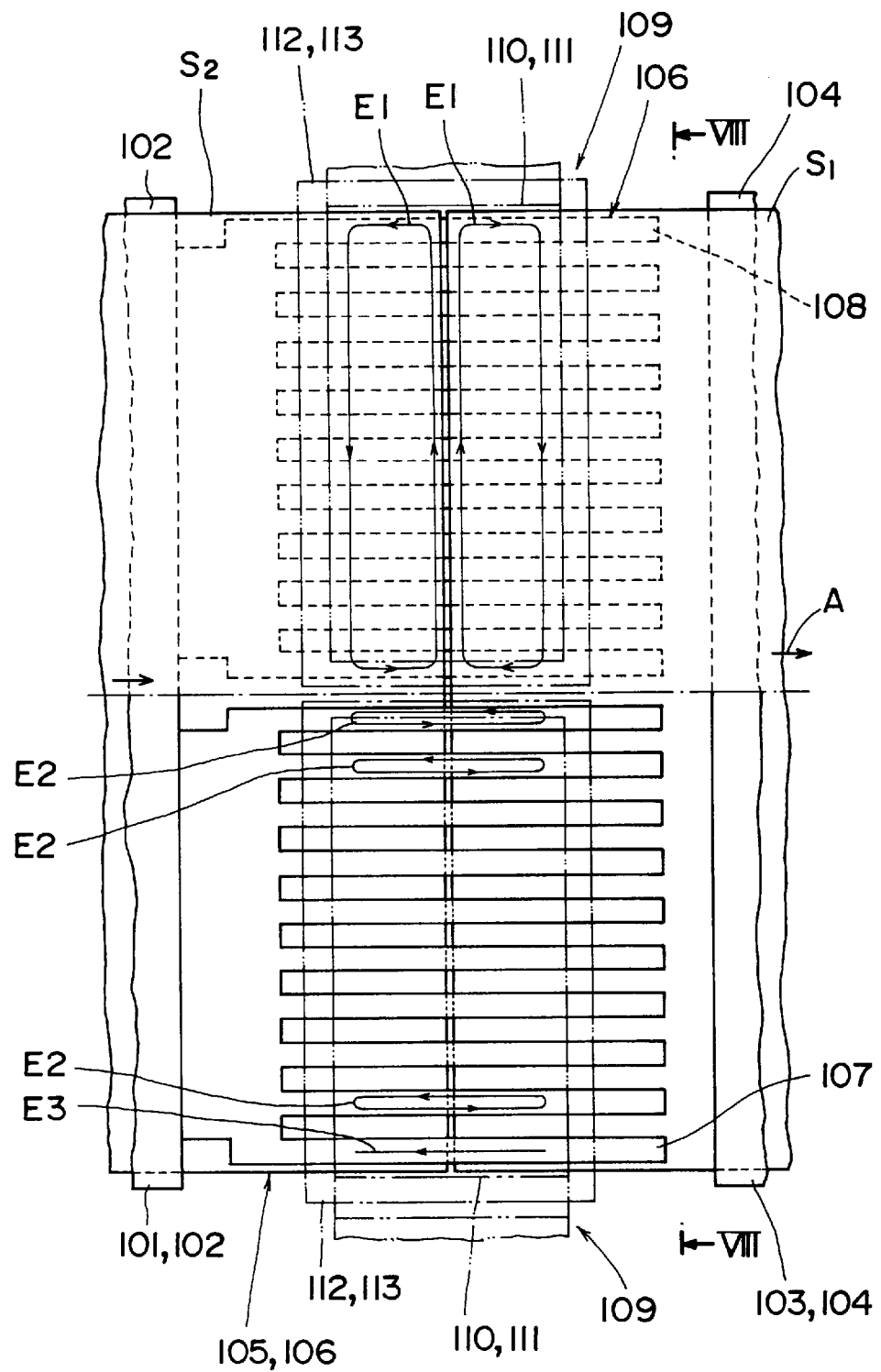
FIG. 7 is a plan view of a conventional sheet bar joining apparatus.
Figure 8:
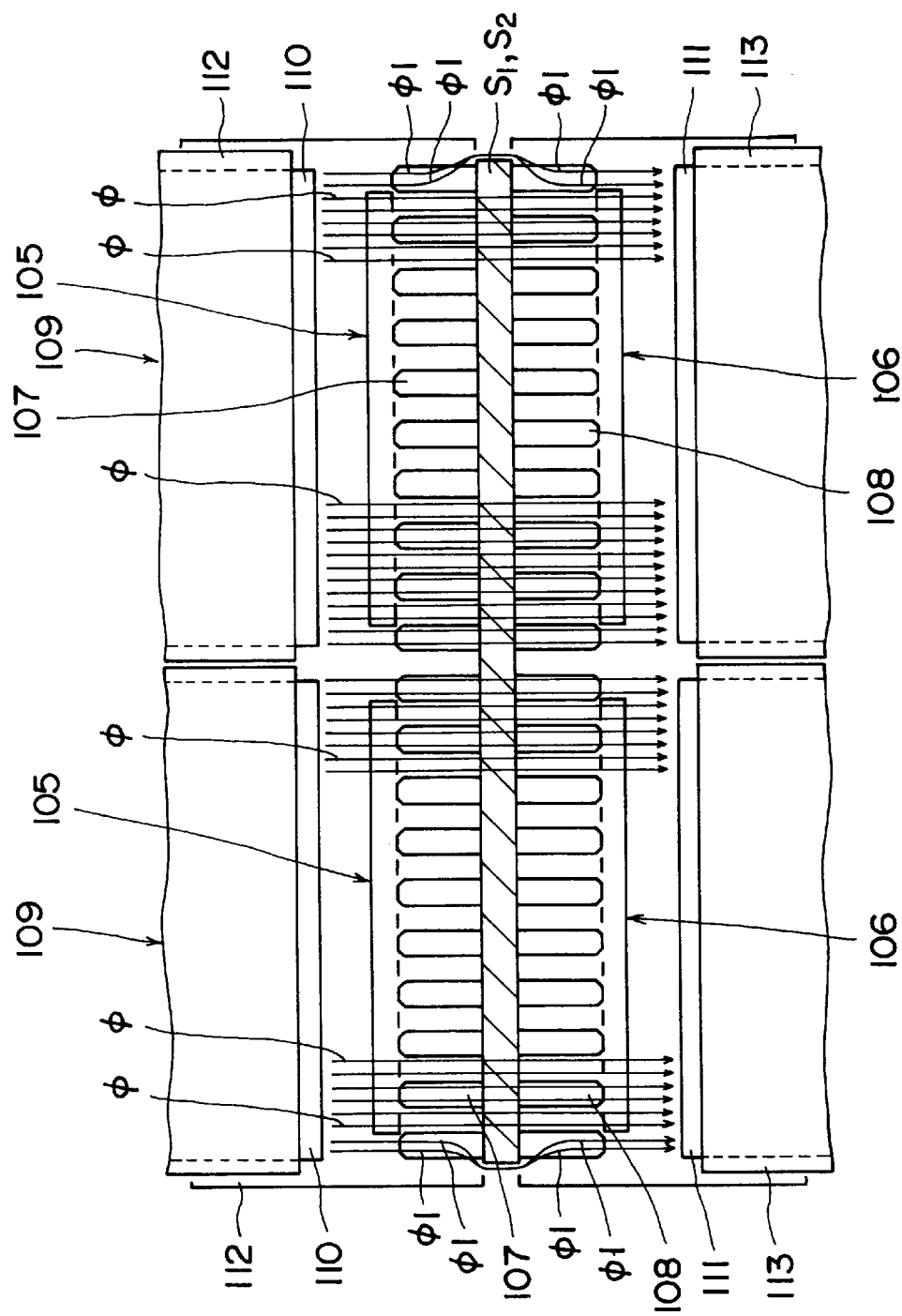
FIG. 8 is a sectional view taken on line VIII—VIII of FIG. 7.
Figure 9:
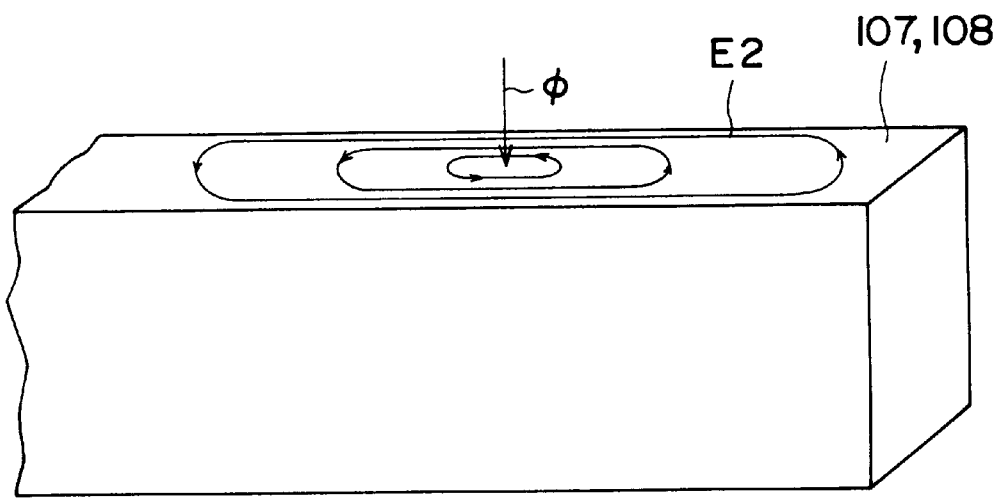
FIGS. 9(a) and 9(b) are schematic views showing an alternating magnetic flux applied from an induction coil in a conventional sheet bar joining apparatus, and eddy currents generated by the alternating magnetic flux.
Figure 9:
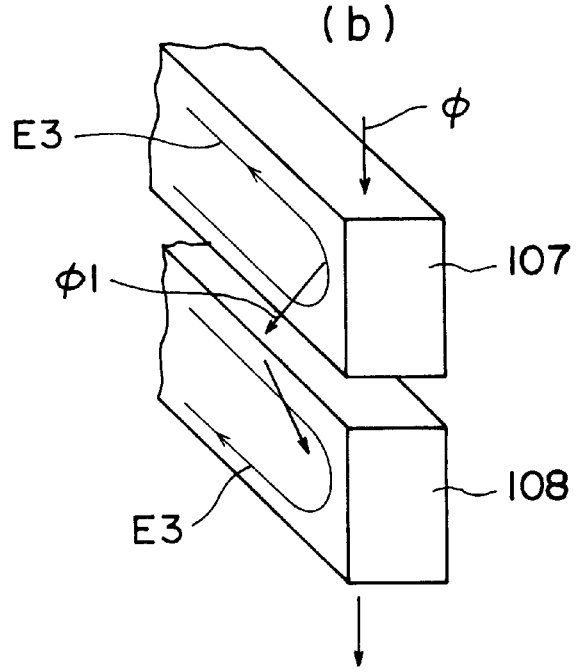

In a sheet bar joining apparatus according to the present embodiment, as illustrated in FIGS. 5 and 6, a preceding sheet bar $S_1$ and a succeeding sheet bar $S_2$ are moved by rolling rolls (not shown) in a direction of an arrow A indicated in FIGS. 5 and 6. A joining trolley 11 has a plurality of wheels 12 on a lower surface thereof, and can run in a direction of an arrow B shown in FIGS. 5 and 6, like the sheet bars $S_1$ and $S_2$, while being guided by a guide rail 13 laid on a floor surface. In the joining trolley 11, a body frame 14 is provided in an erected state, and an entry-side driving roll 16 is provided by a support bracket 15 on an entry side, while a delivery-side driving roll 18 is provided by a support bracket 17 on a delivery side.

On the entry side of the body frame 14, an entry-side clamping mechanism 19 is provided for clamping the succeeding sheet bar $S_2$ from above and below. On the delivery side of the body frame 14, a delivery-side clamping mechanism 20 is provided for clamping the preceding sheet bar $S_1$ from above and below. The entry-side clamping mechanism 19 can be moved in a direction of travel of the sheet bars $S_1$ and $S_2$ by a pressure mechanism 21. In the entry-side clamping mechanism 19, a pair of (i.e., upper and lower) clamp blocks 23 and 24 are supported by an entry-side clamp frame 22 so as to be movable vertically. By the action of a pair of (i.e., upper and lower) clamp cylinders 25 and 26, the upper and lower clamp blocks 23 and 24 can be caused to hold and clamp the sheet bar $S_2$ in a sandwiching manner. The entry-side clamp frame 22 is supported movably by rails 27 laid on the body frame 14, and can be moved by a pressure cylinder 28 constituting the pressure mechanism 21. In the delivery-side clamping mechanism 20, a pair of (i.e., upper and lower) clamp blocks 30 and 31 are supported by a delivery-side clamp frame 29, which is fixed to the body frame 14, so as to be movable vertically. By the action of a pair of (i.e., upper and lower) clamp cylinders 32 and 33, the upper and lower clamp blocks 30 and 31 can be caused to hold and clamp the sheet bar $S_1$ in a sandwiching manner.

The clamp blocks 23 and 24 of the entry-side clamping mechanism 19 are provided with a pair of (i.e., upper and lower) anti-buckling plates 34 and 35, respectively, which extend horizontally toward the delivery side. In these anti-buckling plates 34 and 35, a plurality of upper comb tooth portions 36 and lower comb tooth portions 37, respectively, are formed. Around the anti-buckling plates 34 and 35, a heater 38 is provided. The heater 38 is composed of a C-shaped iron core 39 divided in a plate width direction, and an upper induction coil 42 and a lower induction coil 43 wound round an upper iron core 40 and a lower iron core 41 of the C-shaped iron core 39.

In a range of joining on a travel path of the sheet bars $S_1$ and $S_2$, moreover, a plurality of support bases 44 are arranged parallel below the joining trolley 11 in a direction of movement of the joining trolley 11. On the support base 44, a guide roller 45 and a hoisting and lowering transport roller 46 are mounted rotatably. Each support base 44 can be hoisted and lowered by a hoisting and lowering cylinder 47. On the guide rollers 45, a lower portion presser guide 48, an entry-side presser guide 49, and a delivery-side presser guide 50 for the joining trolley 11 are placed in engagement therewith. A hoist urging force of the hoisting and lowering cylinder 47 is smaller than the weight of the joining trolley 11, so that the guide roller 45 and the hoisting and lowering transport roller 46, on which the joining trolley 11 rests, are adapted to descend to a lowering limit.

The paired upper and lower anti-buckling plates 34 and 35, fixed to the clamp blocks 23 and 24 in the aforementioned entry-side clamping mechanism 19, are described in detail. As shown in FIGS. 1 to 4, the upper and lower anti-buckling plates 34 and 35 are stretched horizontally from the clamp blocks 23 and 24 toward the delivery side, and form the plurality of upper comb tooth portions 36 and lower comb tooth portions 37, respectively, in the width direction. The upper comb tooth portions 36 and the lower comb tooth portions 37 have surfaces opposed to the sheet bars $S_1$ and $S_2$, and heat resistant insulators 51 and 52 comprising, e.g., a ceramic material are fitted into the opposed surfaces in their longitudinal direction.

In the plurality of upper comb tooth portions 36 and lower comb tooth portions 37, a plurality of groove portions 53 and 54, each extending in a vertical direction are formed in the longitudinal direction of the upper and lower comb tooth portions 36 and 37 in the vicinity of their surfaces opposing the sheet bars $S_1$ and $S_2$, i.e., in both sides of the opposed surface of each comb tooth portion, such that the heat resistant insulators 51 and 52 are exposed to the outside. Inside the upper comb tooth portions 36 and the lower comb tooth portions 37, respectively, cooling water flow holes 55 and 56 are formed.

According to the present embodiment, the dimensions of the groove portions 53 and 54 formed in the upper comb tooth portions 36 and the lower comb tooth portions 37 are width W=10 mm, space S=30 to 40 mm, and number n=5 as conditions resulting in the smallest rise in temperature. However, the dimensions need not be restricted to these conditions. For example, the following dimensions may be adopted: width W=5 mm, space S=40 to 50 mm, and number n=5, or width W=5 mm, space S=20 to 30 mm, and number n=9, or width W=10 mm, space S=10 to 15 mm, and number n=11. In such cases, the same actions and effects can be achieved. According to the present embodiment, furthermore, as far as the plate width of each of the sheet bars $S_1$ and $S_2$ is constant, the groove portions 53 and 54 may be present only in both end portions in the width direction of the anti-buckling plates 34 and 35. However, if these groove portions 53 and 54 are provided in the widthwise central portion of each of the anti-buckling plates 34 and 35, passage of magnetic flux $\Phi$ is not affected.

The work of joining the preceding sheet bar $S_1$ and the succeeding sheet bar $S_2$ by the sheet bar joining apparatus of the foregoing embodiment will be described below.

As shown in FIGS. 5 and 6, sheet bars $S_1$ and $S_2$ roughly rolled by rolling rolls (not shown) are continuously supplied to the joining trolley 11 that has halted. When a rear end portion of the preceding sheet bar $S_1$ reaches the center of the heater 38, the clamp cylinders 32 and 33 of the delivery-side clamping mechanism 20 are actuated, with the joining trolley 11 being caused to run at the same speed as the travel speed of the sheet bar $S_1$. Thus, the preceding sheet bar $S_1$ is sandwiched from above and below by the clamp blocks 30 and 31 for its clamping.

Then, the succeeding sheet bar $S_2$ is caused by the entry-side driving roll 16 to follow, at a high speed, the preceding sheet bar $S_1$ that has been clamped in the joining trolley 11. When a gap between a front end portion of the succeeding sheet bar $S_2$ and the rear end portion of the preceding sheet bar $S_1$ reaches a required gap, the clamp cylinders 25 and 26 of the entry-side clamping mechanism 19 are actuated, with the succeeding sheet bar $S_2$ being caused to run at the same speed as the travel speed of the joining trolley 11. Thus, the succeeding sheet bar $S_2$ is sandwiched from above and below by the clamp blocks 23 and 24 for its clamping. At this time, the anti-buckling plates 34 and 35, fixed to the entry-side clamp blocks 23 and 24, also move similarly to hold the rear end portion of the preceding sheet bar $S_1$ and the front end portion of the succeeding sheet bar $S_2$ by the upper and lower heat resistant insulators 51 and 52 in a sandwiching manner. On this occasion, a difference in level between the rear end portion of the preceding sheet bar $S_1$ and the front end portion of the succeeding sheet bar $S_2$ is corrected, and the possible buckling of the sheet bars $S_1$ and $S_2$ is prevented.

Figure 1:
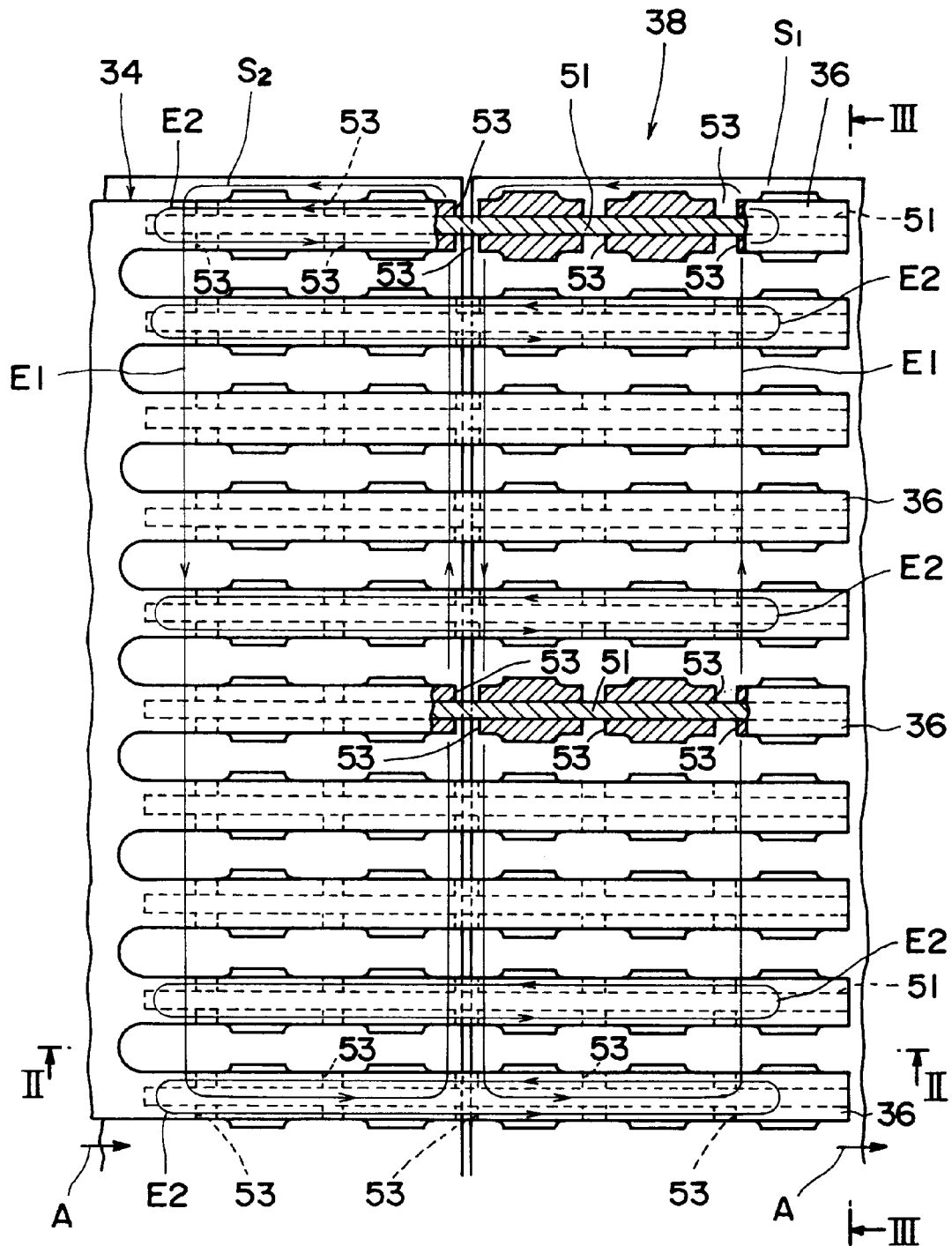
FIG. 1 is a plan view of an essential part of a sheet bar joining apparatus according to an embodiment of the present invention.
Figure 2:
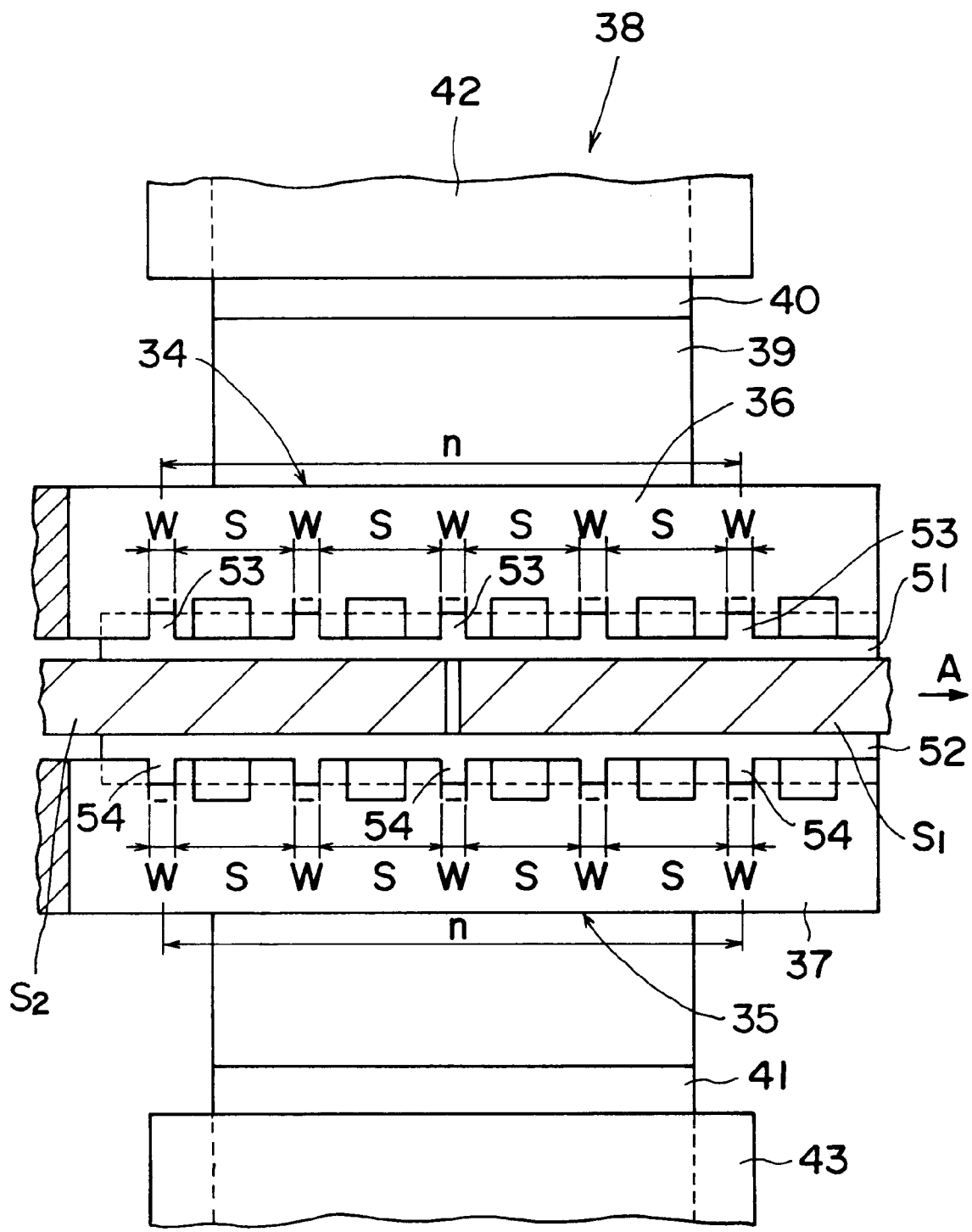
FIG. 2 is a sectional view taken on line II—II of FIG. 1.
Figure 3:
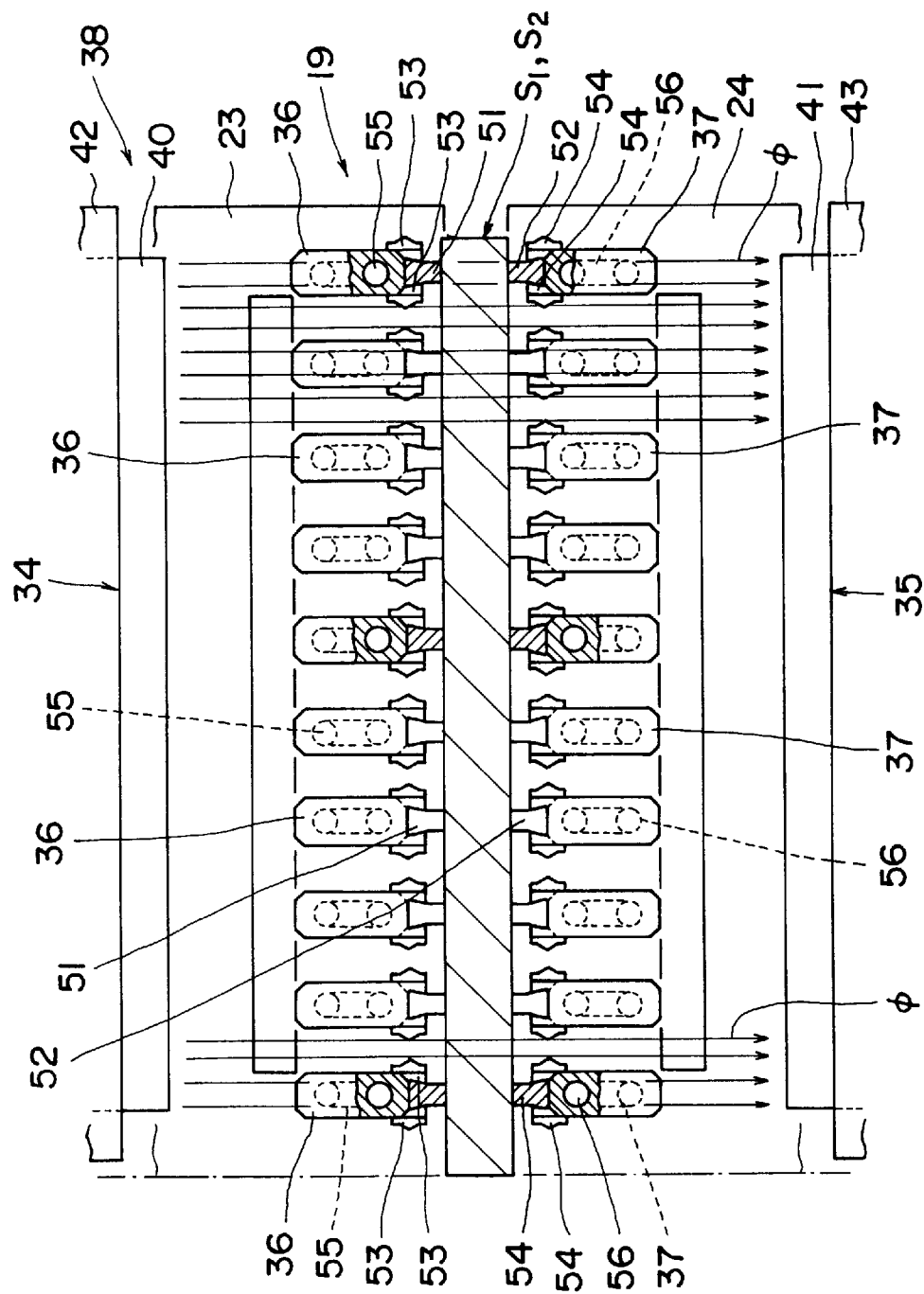
FIG. 3 is a sectional view taken on line III—III of FIG. 1.
Figure 4:
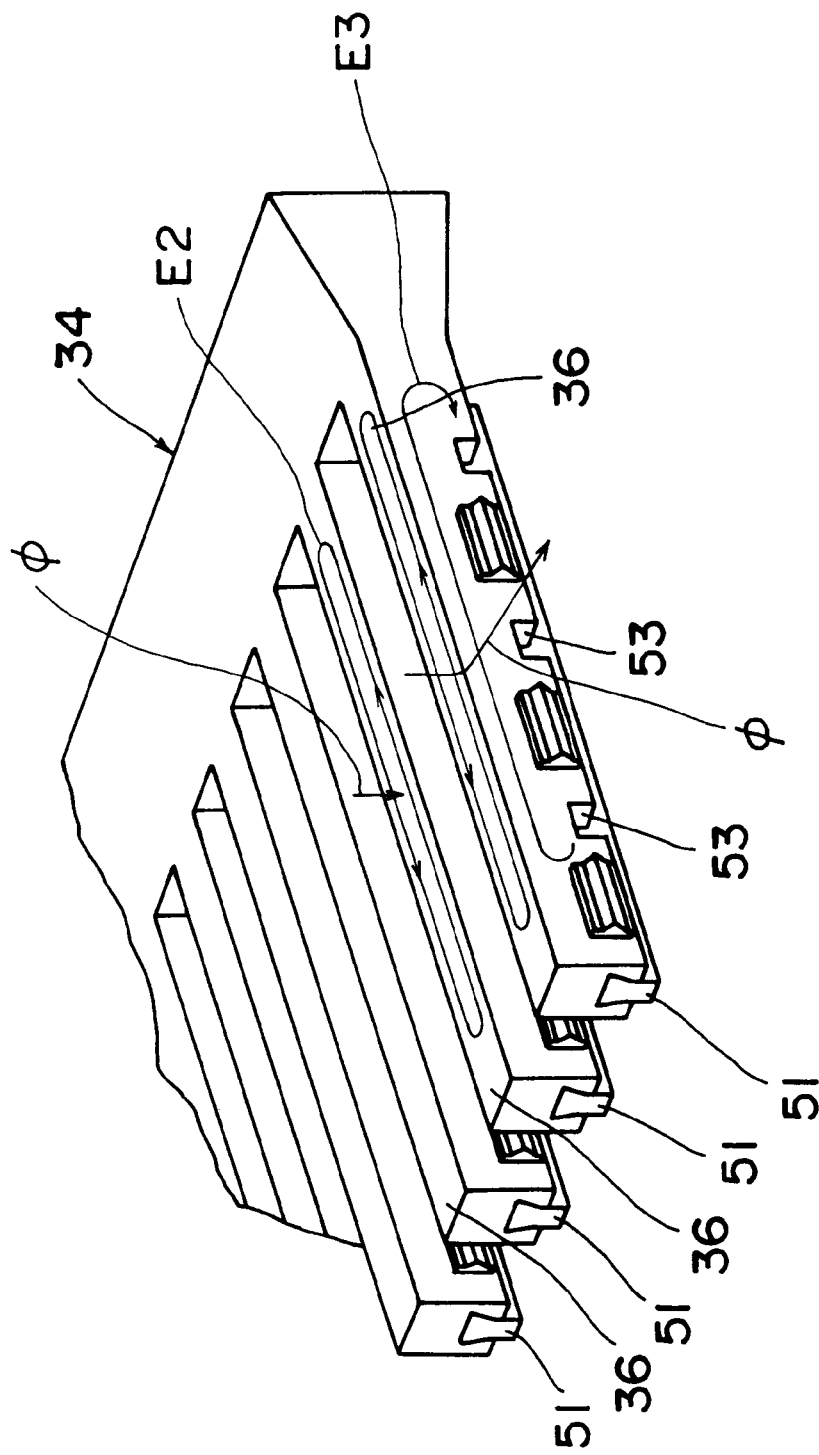
FIG. 4 is a perspective view of an upper anti-buckling plate.

In this state, a high frequency current is applied to the upper induction coil 42 and the lower induction coil 43 to generate a magnetic flux $\Phi$ between the upper and lower cores 40 and 41 of the C-shaped iron core 39, as shown in FIGS. 1 and 3. By this measure, eddy currents E1 are induced in the rear end portion of the preceding sheet bar $S_1$ and the front end portion of the succeeding sheet bar $S_2$ to heat these end portions to a temperature at which they can be joined together. Then, the succeeding sheet bar $S_2$ is moved forward in its travel direction by the pressure cylinder 28 of the pressure mechanism 21 (see FIG. 6). Thus, the front end portion of the succeeding sheet bar $S_2$ is pressed against the rear end portion of the preceding sheet bar $S_1$, whereby the sheet bars $S_1$ and $S_2$ are joined together.

At this time, magnetic flux $\Phi$ also passes through the upper comb tooth portions 36 and the lower comb tooth portion 37 to induce eddy currents E2. However, each of these eddy currents E2 must make a circle in a plane. Since its width is narrow, the circling adjacent eddy currents E2 interfere, counteracting each other. As a result, the current density decreases, and the Joule heat generated becomes small. Besides, at both end portions in the width direction of each of the sheet bars $S_1$ and $S_2$, the magnetic flux $\Phi$ passes obliquely through end portions of the upper comb tooth portions 36 and the lower comb tooth portions 37. Thus, eddy currents E3 are about to be induced in a vertical direction. However, the plurality of groove portions 53 and 54 are formed in the upper comb tooth portions 36 and the lower comb tooth portions 37. Hence, the flow of the eddy currents E3 is impeded, and heat generation of the upper and lower comb tooth portions 36 and 37 can be suppressed.

Upon completion of joining between the rear end portion of the preceding sheet bar $S_1$ and the front end portion of the succeeding sheet bar $S_2$, restraint of the sheet bars $S_1$ and $S_2$ by the clamping mechanisms 19 and 20 and the anti-buckling plates 34 and 35 is released. The joining trolley 11 is moved in the direction opposite to the travel of the sheet bars $S_1$ and $S_2$, to be returned to the original position. Then, preparations are made for the work of joining the sheet bar $S_2$, which will become a preceding sheet bar, to a succeeding sheet bar (not shown) which runs following and in succession to the sheet bar $S_2$.

The sheet bar joining apparatus of the present embodiment, as described above, has the entry-side clamping mechanism 19 and the delivery-side clamping mechanism 20 in the joining trolley 11, the heater 38 between the clamping mechanisms 19 and 20, the anti-buckling plates 34 and 35 on the entry-side clamping mechanism 19, and the heat resistant insulators 51 and 52 fitted into the upper comb tooth portions 36 and the lower comb tooth portions 37 of the anti-buckling plates 34 and 35, respectively. Thus, sparking due to passage of eddy currents E1 and E2 at surfaces of contact between the upper and lower comb tooth portions 36 and 37 and the sheet bars $S_1$ and $S_2$ is eliminated. Consequently, consumption of the upper and lower comb tooth portions 36 and 37 can be suppressed. In addition, heat transfer from the sheet bars $S_1$ and $S_2$, which have been heated to about 100° C., to the upper and lower comb tooth portions 36 and 37 can be inhibited, so that their deterioration due to a temperature rise can be prevented.

Furthermore, the plurality of groove portions 53 and 54 are formed in the upper and lower comb tooth portions 36 and 37 such that the heat resistant insulators 51 and 52 are exposed to the outside. Thus, even when magnetic flux Φ passes transversely through the upper and lower comb tooth portions 36 and 37 corresponding to both end portions in the plate width direction of the sheet bars $S_1$ and $S_2$, eddy currents E3 flowing there decrease, so that heat generation can be suppressed. Consequently, the upper and lower comb tooth portions 36 and 37 are not exposed to high temperatures, their thermal fatigue is reduced, and their life can be prolonged. Moreover, the heat resistance of the upper and lower comb tooth portions 36 and 37 can be increased in conjunction with the effect of the heat resistant insulators 51 and 52.

This invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A sheet bar joining apparatus, comprising:
   a delivery-side clamp adapted to clamp a rear end portion of a preceding sheet bar;
   an entry-side clamp adapted to clamp a front end portion of a succeeding sheet bar;
   a heater provided between said delivery-side clamp and said entry-side clamp, said heater generating a flux that induces eddy currents in said rear end portion of the preceding sheet bar and said front end portion of the succeeding sheet bar to heat said rear end and front end portions;
   anti-buckling plates having an upper plate and a lower plate, said anti-buckling plates adapted to prevent buckling of the sheet bars by holding a rear end of the preceding sheet bar and a front end of the succeeding sheet bar between the upper and lower plates;
   an upper comb tooth portion and a lower comb tooth portion formed in the upper and lower anti-buckling plates, respectively;
   a heat resistant insulator provided at a surface of each of the upper comb tooth portion and the lower comb tooth portion in a surface facing the sheet bars; and
   a plurality of first groove portions provided in the surface of each of the upper comb tooth portion and the lower comb tooth portion facing the sheet bars, said groove portions being provided in a width direction of the upper comb tooth portion and the lower comb tooth portion to suppress eddy current formed in a vertical direction within each of the upper and lower comb tooth portions due to the flux passing obliquely through a side face of said upper and lower comb portions.

2. The sheet bar joining apparatus of claim 1, wherein the heat resistant insulator is fitted into each of the upper comb tooth portion and the lower comb tooth portion in a longitudinal direction thereof.

3. The sheet bar joining apparatus of claim 1, wherein a plurality of second groove portions are provided in each of the upper comb tooth portion and the lower comb tooth portion in a longitudinal direction thereof.

4. The sheet bar joining apparatus of claim 3, wherein said plurality of second groove portions are provided in both sides of each of the upper comb tooth portion and the lower comb tooth portion such that the heat resistance insulator is exposed.

5. The sheet bar joining apparatus of claim 1, wherein a cooling water flow hole is provided inside each of the upper comb tooth portion and the lower comb tooth portion.

6. The sheet bar joining apparatus of claim 1, wherein the heater has a C-shaped iron core divided in a width direction of the sheet bars, and induction coils wound around the C-shaped iron core.

7. The sheet bar joining apparatus of claim 1, wherein the entry-side clamp is movable in a direction of travel of the sheet bars.

8. The sheet bar joining apparatus of claim 1, wherein said plurality of groove portions include five grooves provided at an interval of about 30–40 mm, each groove having a width of about 10 mm.

9. The sheet bar joining apparatus of claim 1, wherein said plurality of groove portions include five grooves provided at an interval of about 40–50 mm, each groove having a width of about 5 mm.

10. The sheet bar joining apparatus of claim 1, wherein said plurality of groove portions include nine grooves provided at an interval of about 20–30 mm, each groove having a width of about 5 mm.

11. The sheet bar joining apparatus of claim 1, wherein said plurality of groove portions include eleven grooves provided at an interval of about 10–15 mm, each groove having a width of about 10 mm.

12. A sheet bar joining apparatus, comprising:
   a heater adapted to generate a flux that induces eddy currents in a rear end portion of a preceding sheet bar and a front end portion of a succeeding sheet bar to heat said rear end and front end portions;
   anti-buckling plates having an upper plate and a lower plate, said anti-buckling plates adapted to prevent buckling of the sheet bars by holding a rear end of the preceding sheet bar and a front end of the succeeding sheet bar between the upper and lower plates;

an upper comb tooth portion and a lower comb tooth portion formed in the upper and lower anti-buckling plates, respectively; and a plurality of grooves provided in a surface of each of said upper comb tooth portion and said lower comb tooth portion facing the sheet bars, said grooves being provided in a width direction of said upper comb tooth portion and said lower comb tooth portion to suppress eddy current formed in a vertical direction within said upper and lower comb tooth portions due to the flux passing obliquely through a side face of said upper and lower comb portions.

* * * * *